(12) United States Patent
Marcove et al.

(10) Patent No.: US 8,816,586 B2
(45) Date of Patent: Aug. 26, 2014

(54) ILLUMINATED DEVICES ATTACHED TO VEHICLES

(75) Inventors: Howard Marcove, Denver, CO (US); Philip Allen Boe, Lone Tree, CO (US)

(73) Assignee: CMarlite, LLC, Denver, CO (US)

( * ) Notice: Subject to any disclaimer, the term of this patent is extended or adjusted under 35 U.S.C. 154(b) by 169 days.

(21) Appl. No.: 13/444,328

(22) Filed: Apr. 11, 2012

(65) Prior Publication Data

US 2012/0256543 A1  Oct. 11, 2012

Related U.S. Application Data

(60) Provisional application No. 61/474,090, filed on Apr. 11, 2011, provisional application No. 61/538,550, filed on Sep. 23, 2011.

(51) Int. Cl.
*H05B 37/02* (2006.01)
(52) U.S. Cl.
USPC ............. 315/77; 362/157; 362/183; 362/459; 362/509
(58) Field of Classification Search
USPC ............. 315/77, 82, 88, 90, 89, 93, 127–136, 315/185 R, 192, 209 R, 210, 297, 306–320, 315/362; 362/509, 516, 157, 459, 183, 538, 362/542, 541, 487, 489, 496, 540
See application file for complete search history.

(56) References Cited

U.S. PATENT DOCUMENTS

| | | | |
|---|---|---|---|
| 5,150,961 A | 9/1992 | Gonzalez | |
| 5,408,772 A | 4/1995 | Pettyjohn | |
| 5,709,453 A | 1/1998 | Krent et al. | |
| 5,779,345 A | 7/1998 | Adams | |
| 5,803,577 A | 9/1998 | Stratton | |
| 6,190,026 B1 | 2/2001 | Moore | |
| 6,404,334 B1 | 6/2002 | Chao | |
| 6,478,458 B2 | 11/2002 | Hickman | |
| 6,526,680 B1 | 3/2003 | Yu | |
| 6,729,055 B2 * | 5/2004 | Chou | 40/546 |
| 6,735,893 B2 * | 5/2004 | Wolf | 40/591 |
| 6,874,922 B2 | 4/2005 | Matsuura et al. | |
| 7,079,042 B2 | 7/2006 | Reim | |
| 7,111,955 B2 | 9/2006 | Tsai et al. | |
| 7,163,322 B2 | 1/2007 | Tatewaki et al. | |
| 7,175,324 B2 | 2/2007 | Kwon | |
| 7,192,148 B2 | 3/2007 | Tsai et al. | |
| 7,195,385 B2 | 3/2007 | Zimmermann et al. | |
| 7,249,869 B2 | 7/2007 | Takahashi et al. | |
| 7,430,822 B1 | 10/2008 | Combs | |
| 7,712,933 B2 | 5/2010 | Fleischmann et al. | |
| 7,804,418 B2 | 9/2010 | Sullivan et al. | |
| 7,845,836 B2 | 12/2010 | Okuda | |
| 7,862,220 B2 | 1/2011 | Cannon et al. | |
| 7,866,858 B2 | 1/2011 | Hirzmann | |
| 7,874,713 B2 | 1/2011 | Kwon | |
| 7,931,393 B2 * | 4/2011 | Stempinski | 362/496 |
| 2002/0105811 A1 | 8/2002 | Hickman | |

(Continued)

*Primary Examiner* — Thienvu Tran
*Assistant Examiner* — Christopher Lo
(74) *Attorney, Agent, or Firm* — Sheridan Ross, P.C.

(57) ABSTRACT

The present disclosure is directed to illuminated devices attached to vehicles. More specifically, an illuminated device may be attached to a vehicle in the form of an illuminated logo or emblem. The illumination of the device may be controlled for color, state, and/or intensity in response to vehicle signals received by the device. In addition, the illuminated device may use switching circuitry to interface with a vehicle's electrical power and/or signals.

20 Claims, 9 Drawing Sheets

(56) References Cited

U.S. PATENT DOCUMENTS

| | | | |
|---|---|---|---|
| 2002/0105812 A1* | 8/2002 | Zimmermann et al. | 362/487 |
| 2003/0079387 A1 | 5/2003 | Derose | |
| 2005/0094405 A1 | 5/2005 | Tatewaki et al. | |
| 2005/0134475 A1* | 6/2005 | Reim | 340/815.45 |
| 2006/0023468 A1* | 2/2006 | Takahashi et al. | 362/555 |
| 2006/0103638 A1 | 5/2006 | Podd | |
| 2006/0203502 A1 | 9/2006 | Stevens et al. | |
| 2007/0097698 A1 | 5/2007 | Song et al. | |
| 2007/0103922 A1 | 5/2007 | Rissmiller et al. | |
| 2007/0118423 A1 | 5/2007 | Always | |
| 2007/0209244 A1 | 9/2007 | Prollius et al. | |
| 2007/0258262 A1 | 11/2007 | Hanyon | |
| 2007/0274085 A1 | 11/2007 | Hampton | |
| 2008/0068857 A1 | 3/2008 | Meinke et al. | |
| 2008/0090031 A1* | 4/2008 | Hirzmann | 428/31 |
| 2008/0104870 A1 | 5/2008 | Alden | |
| 2009/0213582 A1 | 8/2009 | Thomas | |
| 2009/0213586 A1 | 8/2009 | Peng | |
| 2009/0257241 A1 | 10/2009 | Meinke et al. | |
| 2009/0277059 A1 | 11/2009 | Kwon | |
| 2010/0132232 A1 | 6/2010 | Frisch | |
| 2010/0154261 A1 | 6/2010 | Bozlo et al. | |
| 2010/0186214 A1 | 7/2010 | Judge | |
| 2010/0246198 A1 | 9/2010 | Hook et al. | |
| 2012/0182722 A1* | 7/2012 | Wu | 362/157 |

* cited by examiner

ILLUMINATED DEVICES ATTACHED TO VEHICLES

CROSS REFERENCE TO RELATED APPLICATIONS

The present application claims the benefit of and priority, under 35 U.S.C. §119(e), to U.S. Provisional Application Ser. No. 61/474,090, filed Apr. 11, 2011, entitled "ILLUMINATED DEVICES ATTACHED TO VEHICLES," and U.S. Provisional Patent Application Ser. No. 61/538,550, filed Sep. 23, 2011, entitled "ILLUMINATED DEVICES ATTACHED TO VEHICLES," which are hereby incorporated herein by reference in their entirety for all that they teach and for all purposes.

FIELD OF THE DISCLOSURE

The present disclosure relates to illuminated devices attached to vehicles. Particularly, the disclosure provides embodiments of illuminated devices that attach to or near identification plates, marks, manufacturing symbol attachment points, or other areas of vehicles.

BACKGROUND

Traditionally, logos and emblems have been employed by various people to distinguish and identify the source of various goods or property. In addition to identifying source, manufacturers rely on the use of logos and emblems, in conjunction with the benefit of trademark protection, to establish and protect their reputation. A discerning consumer may recognize a manufacturer by its logo or emblem and immediately be reminded of the manufacturer's reputation.

It is well known that a good reputation is linked with status in a community. For instance, a specific logo or emblem may be associated with a reputation for luxury and quality in the manufacture of vehicles. As such, the vehicle consumer and/or manufacturer may take pride in emphasizing the display of their vehicle's emblems as well as the corresponding good reputation associated therewith. Moreover, an individual may take pride in a specific cultural heritage, country, sports team, cause, or the like. In these cases, the individual may want to emphasize this pride by displaying the representative emblem or logo on a vehicle.

Historically, the emphasis of a logo or emblem was achieved by increasing the number of logos/emblems on a vehicle or by adjusting the physical size of the logo/emblem itself. However, simply increasing the size and/or quantity of logos/emblems on a vehicle may achieve the desired effect of emphasis, but diminish the effect of status and/or pride proportionally.

Although some solutions may exist in the prior art that are directed to emphasizing the display of a logo or emblem with illumination, they typically involve directing an external light onto a vehicle emblem. Moreover, the directed light is typically a single color, or bulb, and cannot change color to indicate conditions or states associated with the vehicle. Additionally, the light is usually configured to illuminate the entire emblem in a non-uniform manner (i.e., areas of the emblem that are located further from the light source appear darker than the areas of the emblem that are located closer to the light source). Among other things, the prior art solutions fail to provide a dynamic emphasis of a logo or emblem while maintaining a sense of quality, luxury, or status.

SUMMARY

It is, therefore, one aspect of the present disclosure to provide an illuminated device for attaching to vehicles to visibly emphasize a logo or emblem while maintaining a sense of quality, luxury, and/or status in a vehicle. In general, the illuminated device may be configured to provide the illumination of a logo or emblem by directing light in various directions around, through, inside, or adjacent to the logo/emblem to obtain the desired lighting effect. Additionally or alternatively, the type of illumination may change according to vehicle functions and/or user input. For instance, the color, brightness, state (e.g., flashing or solid display), or combinations thereof may be adjusted for effect.

The device may include various plates and components that stack upon one another, attachment means to the vehicle, a power source and an illumination means. In some embodiments, the device may include switching circuitry to interface with various signals that may be received from a vehicle. The plates and components may include at least one emblem plate of special design intended to be illuminated, such as the vehicle's make (e.g., BMW, Chevrolet, Lexus, etc.), sports team (e.g., Denver Broncos), flag, or custom logo. The attachment means may include one or more of screws, bolts, and interference fits. The power source may include at least one of the vehicle battery, a self-contained source such as a battery, electrical power produced by the vehicle, wind power, and solar power devices. The illumination source may include one or more of an incandescent light bulb, fluorescent lighting light bulb, electro-luminescent foil, and light-emitting diodes ("LED"). The illuminated devices may attach to a vehicle using existing vehicle mounts for manufacturer logos, emblems, or indication lights, to a location on the existing vehicle license plate holder, to a location adjacent to or near the existing license plate holder using a mounting structure, or other area of the vehicle using custom mounting features.

By way of providing additional background and context, the following references are incorporated by reference in their entireties for the purpose of explaining the nature of illuminated devices attached to vehicles and other apparatus commonly associated therewith: U.S. Pat. No. 7,866,858 to Hirzmann entitled "ASSEMBLY FOR THE ILLUMINATED DISPLAY OF A LOGO" issued Jan. 11, 2011, U.S. Pat. No. 7,192,148 to Tsai entitled "ILLUMINATED LOGO UNIT WITH REFLECTIVE DEVICE" issued Mar. 20, 2007, U.S. Patent Publication No. 2010/0186214 to Judge entitled "LIGHT FOR VEHICLES" issued Jul. 29, 2010, and U.S. Pat. No. 6,190,026 to Moore entitled "ILLUMINATED AUTOMOTIVE EMBLEM" issued Feb. 20, 2001.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, scooters, bicycles, busses, automobiles, trains, toys, carts, railed conveyances, boats, ships, marine conveyances, submarine conveyances, airplanes, space craft, flying machines, human-powered conveyances, and the like.

The term "attach" and variations thereof, as used herein, refers to any method, technique, or process to secure one thing to another. The attachment means may be removable, permanent, or semi-permanent. Typical attachments may include securing by adhesive, magnetic attraction, interference fit, fastener connections, tongue-in-groove, dovetail, press-fit, welding, ultrasonic welding, and the like. Accordingly, the terms "join," "connect," "adhere," "fix," "affix," "append," "glue," "screw," and "fasten" can be used interchangeably herein.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The accompanying drawings, which are incorporated in and constitute a part of the specification, illustrate embodiments of the disclosure and together with the general description of the disclosure given above, and the description of the drawings given below, serve to explain the principals of this disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
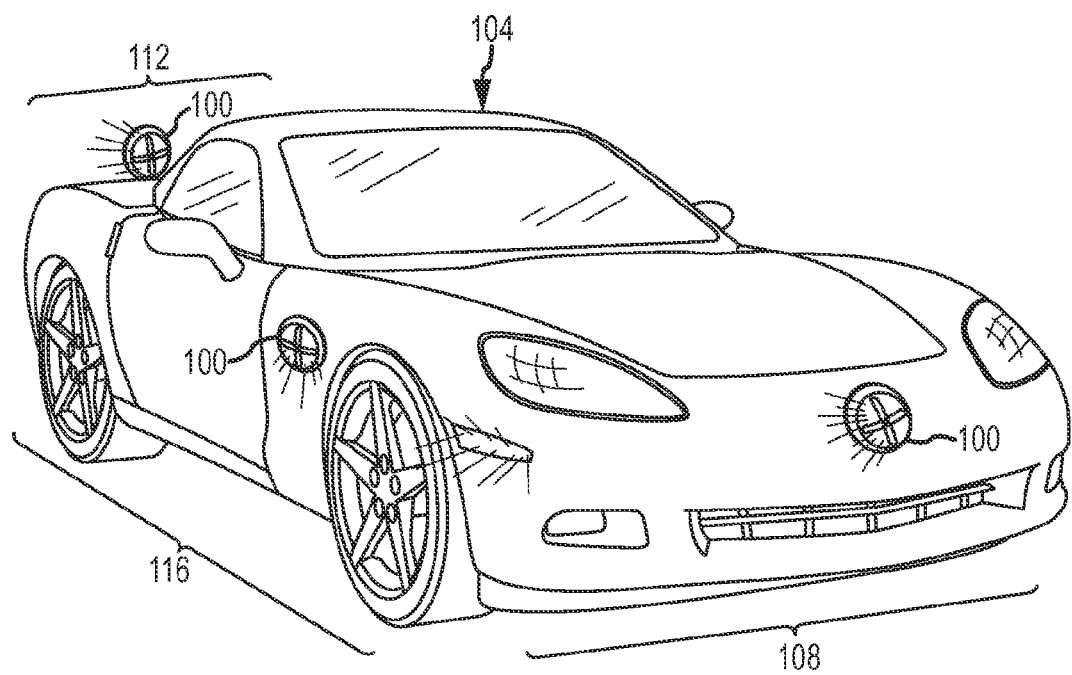
FIG. 1 is a view of at least one illuminated device attached to a vehicle in accordance with embodiments of the present disclosure.

FIG. 1 shows a view of at least one illuminated device 100 attached to a vehicle 104 in accordance with embodiments of the present disclosure. It is anticipated that one or more illuminated devices 100 may be attached to a vehicle 104 in a number of different locations on the vehicle. These locations, or areas, may include but are not limited to the front of a vehicle 108, the rear of a vehicle 112, the side of a vehicle 116, the bottom of a vehicle, the top of a vehicle, and combinations thereof. Further, it is anticipated that the illuminated devices 100 may behave differently according to their location on the vehicle 104. For instance, an illuminated device 100 attached to the rear of a vehicle 112 may be configured to illuminate in accordance with the illuminated vehicle functions that are commonly associated with the rear of a vehicle 112. These functions may include but are not limited to indication (turn signal) left and right, braking, reversing, running lights, and/or hazard (emergency). This illumination behavior may even alter the colors and state for each function on conditions. In the aforementioned functions, the indication signals may display in a flashing amber, orange, or red color, the reversing function may display in an apparent solid (i.e., non-flashing, or flashing at a rate that is imperceptible by the human eye) white color, while the braking lights may display in an intense solid red color.

In the event that an illuminated device 100 is attached to the side of a vehicle 116, the device 100 may exhibit similar functions to those described above, or be dedicated to a particular function or set of functions. For example, an illuminated device 100 affixed to the side of a vehicle 116 may be configured to alter a lighting effect to flash, or blink, a color when the indicator signal is received on the side where the illuminated device 100 is located. It is anticipated that any combination of colors and/or states may be generated by the device 100 and associated switching circuitry. In some embodiments, the colors and/or states of the illuminated device 100 may be configured to transition from one color and/or state to another color and/or state in a programmed, random, or pseudo-random, manner.

At least one illuminated device 100 may be attached to one or more locations on the front of a vehicle 108. As can be appreciated, the light and/or behavior of the illuminated device 100 on the front of the vehicle 108 could be configured differently from the light and/or behavior properties exhibited by other locations of the vehicle. In one embodiment, an illuminated device 100 on the front of a vehicle 108 may be configured to mimic the operation of, for example, headlights.

The at least one illuminated device 100 may gradually increase intensity and/or change color when the vehicle 104 is started. Additionally or alternatively, the at least one illuminated device 100 may be configured to fade to lower levels of intensity, and even turn off, when power to the vehicle 104 is turned off.

It can be appreciated that one or more illuminated devices 100 attached to a vehicle 104 may be configured to exhibit any desired behavior defined by one or more of illumination intensity, color, pattern, transition, timing, and combinations thereof. The behavior of an illuminated device 100 may be dependent upon attachment location on a vehicle 104. Additionally or alternatively, the behavior of an illuminated device 100 may be independent of attachment location on a vehicle.

Figure 2:
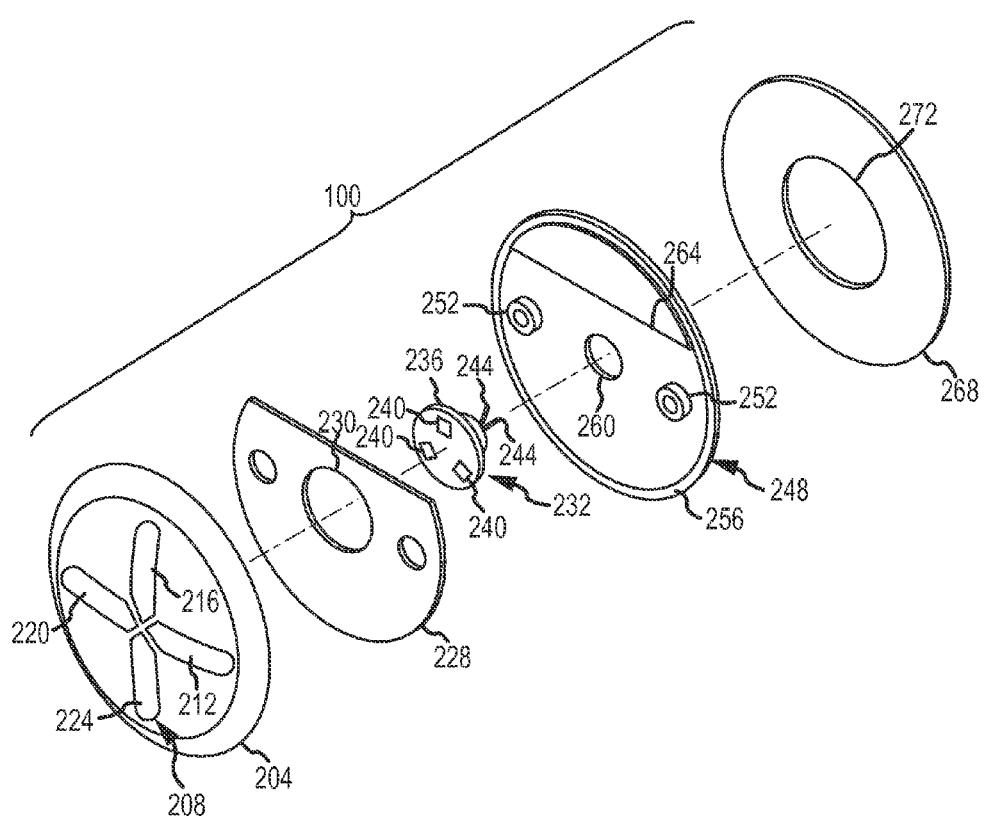
FIG. 2 is an exploded perspective view of components of an illuminated device in accordance with embodiments of the present disclosure.

Referring now to FIG. 2, an exploded perspective view of components of an illuminated device 100 is shown in accordance with the present disclosure. In an embodiment of the present disclosure the device 100 includes a front plate 204 and affixed logo/emblem 208, attached to a mounting base 248, a light source 232 attached in front of the mounting base 248, and light directing element(s) 228 attached between the front plate 204 and the mounting base 248. In some embodiments, the illuminated device 100 may include a retaining plate 268 that is capable of being removably attached to the mounting base 248.

The mounting base 248 may include one or more features 260, 264 to receive and secure the light source 232. Furthermore, the mounting base 248 may include a feature 260 to allow an electrical connection to pass through to the light source 232. In addition, the mounting base 248 may incorporate features 252, 260 to append the device to the vehicle 104 or mounting surface.

The front plate 204 of the illuminated device 100 may include a logo/emblem 208. In some embodiments, the front plate 204 and the logo/emblem 208 may be constructed as a single piece. Alternatively, the logo/emblem 208 may be affixed to the front plate 204 in such a manner that the front plate 204 and logo/emblem 208 become a single piece. This joining of the front plate 204 and the logo/emblem 208 may be achieved via one or more of ultrasonic welding, welding, heat staking, UV curing, adhesive attachment, interference fit, mechanical fastening, and chemical fastening. Additionally or alternatively, the logo/emblem 208 may be painted, printed, and/or masked onto the front plate 204.

The logo/emblem 208 and/or the front plate 204 may be one or more of opaque, translucent, and transparent. In some embodiments, the logo/emblem 208 may be split into one or more sections 212, 216, 220, 224. It is anticipated that these one or more sections 212, 216, 220, 224 may be individually and separately illuminated by the light source 232 of the illuminated device 100. As can be appreciated, the one or more sections 212, 216, 220, 224 may be made from a translucent material and/or masked to achieve the desired effect of light passing through the sections 212, 216, 220, 224 to illuminate at least a portion of the front surface of the logo/emblem 208.

According to various embodiments of the present disclosure, the logo/emblem 208 may be of a variety of shapes and/or sizes. Further, the logo/emblem 208 can be a transparent or semi-transparent cover that houses a removable insert, the insert being manufactured from a masked translucent material incorporating a custom logo or image, where the light source 232 can emanate through the translucent portion of the insert. In some embodiments of the disclosure, the logo/emblem 208 may be a custom logo. The custom logo may be a colored or uncolored image on translucent material. In other embodiments, the custom logo or image may be masked as opaque, and the background of the insert may be a colored or uncolored translucent material. Also, the insert may be keyed or located in the transparent cover, emblem, or unit to prevent unwanted rotation or movement.

In some embodiments, the illuminated device 100 may include at least one light directing element 228. The light directing element 228 may be configured to diffuse, direct, block, and/or transmit light. In accordance with one aspect of the present disclosure, the light directing element 228 may be configured to alter the behavior of light emanating from the light source 232. Configuring the light directing element 228 to alter the behavior of the light may correspond to the element's 228 specific position, shape, angle, material, finish, facets, and combinations thereof. In one embodiment, the light directing element 228 may be removably attached to the illuminated device 100. The removable attachment of the light directing element 228 can provide for exchanging and replacing the light directing element 228 to, among other things, exhibit different light directing and behavior properties. For example, a light directing element 228 may be used to provide at least one different color (e.g., adding a pigment to the material, masking, painting, etc.) and/or light directing configuration (e.g., via facets, angles, masking and the like). Additionally or alternatively, one or more light directing elements 228 may be stacked upon one another to similarly alter the behavior and/or light properties emanating from the device 100. However, the addition of one or more light directing elements 228 is not limited to stacking, but may also include other means of combining the elements 228. For example, light directing elements 228 may be inserted within the area of an existing light directing element 228 (e.g., one or more concentric rings of different light directing elements 228, etc.).

The light directing element 228 may be configured such that removal and repositioning of the element 228 on the device 100 may change the light direction and/or diffusing path without requiring changes to the light source. In some embodiments, the light directing element 228 may be manufactured from different translucent or transparent material and/or colors to visually alter the light emanating from the device. In still other embodiments, the light directing element 228 may incorporate a series of geometric facets and/or angular faces to guide light in one or more specific directions from the light source 232. In addition, the light directing element 228 may be masked in areas to block the transmission of light from that masked area or path adjacent to the masked area.

It is an aspect of the present disclosure that the illuminated device 100 includes at least one light source 232. The light source 232 may comprise one or more lighting elements 240 attached to a base 236 and one or more electrical leads 244 conductively connected to the one or more lighting elements 240. The light source 232 may include one or more of an incandescent light bulb, fluorescent lighting light bulb, electro-luminescent foil, and light-emitting diodes ("LED"). In some embodiments, the light source 232 may be capable of producing light in multiple colors. These multiple colors may be produced by the lighting elements 240 emitting varying intensities of colors together to form a combined color (e.g., similar to the red, green, blue, or RGB, of pixels in a display, where all colors may be brightly emitted at once to produce a white color). Commercially available LEDs allow for the ability to produce multiple colors, such as Cree® brand XLamp® MC-E four-color (e.g., red, green, blue, and neutral/cool white) LED, Cree® brand IPX6-Rated SMD Full-Color 3-in-1 RGB LEDs, Model Nos. CLX6A-FKB, CLV6A-FKB, CLMVB-FKA, CLPPA-FKB, CLP6C-FKB, CLV1A-FKB, and CLVBA-FKA, and the like. Additionally or alternatively, the multiple colors may be produced by utilizing a colored filter in conjunction with a lighting element. In some embodiments, individual LEDs of a single color may be utilized to produce a number of colors. For example, the illuminated device 100 may include such LEDs as Cree® brand XLamp® Model Nos. ML-E, XP-E, XP-C, XR-C, and the like.

As previously stated and in accordance with some embodiments of the present disclosure, the mounting base 248 may include features 260, 264 to receive and secure the light source 232. For instance, the mounting base 248 may use a pass-through 260 for the purposes of receiving and even securing the light source 232. The pass-through 260 itself may be configured to prevent unwanted rotation and/or movement of the light source 232. In some embodiments, the pass-through 260, and even the light source 232, may utilize key features, such as keyways, complementary features, interference fits, and the like to prevent rotation and secure the light source 232. It is anticipated that key features may be located adjacent to, or apart from, the pass-through 260 in the form of an alternate surface 264.

The electrical leads 244 may be configured to direct electrical power and/or electrical signals to the one or more lighting elements 240 of the light source 232. In one embodiment, the electrical leads 244 may pass through the base 236 to the one or more lighting elements 240. In yet another embodiment, the base 236 may include a printed circuit board ("PCB"), or equivalent. In this case, the electrical leads 244 may be configured to connect to the PCB, which in turn may be connected to the one or more lighting elements 240.

It is an aspect of the present disclosure that the light source 232 be powered by a vehicle power source such as an alternator. In addition, the light source 232 and the light output may be controlled by certain vehicle functions. The vehicle functions may include but are not limited to braking, reversing, indicating, emergency and/or hazard lighting, flood light activation, daytime running light operation, low and high beam operation, or combinations thereof. In accordance with the present disclosure, the light source 232 may be mounted in such a manner as to direct light toward the rear surface of the logo/emblem 208, in a direction opposite the rear surface of the logo/emblem 208, radially outward from the center of the logo/emblem 208, around the device 100, or cast light in multiple directions simultaneously.

In some embodiments, the light source 232 of the illuminated device 100 may be electrically connected to switching circuitry. This switching circuitry may, in turn, be connected to the power source of a vehicle. The switching circuitry may include but is not limited to one or more of a diode, relay, processor, input, output, and the like. In accordance with the present disclosure, the switching circuitry input may be configured to receive electrical power (e.g., from a vehicle's ignition, alternator, and the like), electrical ground, various vehicle signals (as disclosed herein) and the like. The output of the electrical power supplied to the light source 232 may be selectively controlled by the switching circuitry and/or the vehicle control system. On the other hand, the output of the switching circuitry may include electrical power that can be directed to the light source 232 and may even include an electrical ground connection.

Further, the light source 232 may be configured such that the light emanates from the unit radially, casting a glow around a major portion of the emblem periphery, producing a "halo" type of effect. It is anticipated that sections of this halo of light may be blocked or redirected so as to prevent light from emanating from a specific area of the device 100. In embodiments, this redirection of light may equally apply to any type of light emanating from the device 100. Preventing the emanation of light from certain areas would be best suited for applications where such light may interfere with a person's or persons' unobstructed view. In one embodiment, a halo of light may be produced around the periphery of a logo/emblem 208 using a portion of electroluminescent ("EL") foil that extends beyond the periphery of the logo/emblem 208.

In some embodiments, the halo and the light emanating from the device 100 may be controlled as to color, intensity, direction, and location. This control may be performed in response to the typical vehicle functions described herein. For example, the halo may illuminate in a visible red color and/or increase intensity (or lumen output) when vehicle brakes are applied or when brake lights are activated. The color of the halo and/or other emanating light may be achieved by integrating multi-colored LEDs, LEDs or lights of specific colors, or colored transparent/translucent light directing element(s) 228 in the device 100. In addition, the device 100 may include specific colored LED's, lights, or specially colored light directing elements 228 to achieve a similar result. To control the intensity, the device 100 may use a greater number of LEDs or lights for high-intensity situations and less LEDs or lights for other situations. Additionally, the LEDs or lights may be configured such that an adjustment to the electrical supply of the light source 232 controls the output intensity levels.

In another embodiment the device 100 may be configured such that LEDs or lights are oriented so produced light emanates from one or more specific location on the device. For example, in a situation where a vehicle is indicating or activating a turn signal, the halo may display an intermittent flashing or constant signal from an appropriate side of the device 100.

Moreover, the direction of the light emanating from the device 100 and/or the halo may be further directed by features of the device 100. In particular, the device 100 may include LEDs and/or lights oriented in a plurality of positions that, when activated, produce light in different directions dictated by the position of the LEDs and/or lights. In some embodiments, the direction of the light emanating from the device 100 may be directed by mechanical features. For instance, light produced from the device may be directed using prismatic lens features or other angled faces designed into the light directing element(s) 228. Additionally, the light may be blocked with and/or focused in areas using mechanical features 264. It is anticipated that light emanating from the device 100 may be directed with a combination of light directing features 256, mechanical features 264 and/or light source 232 positions. For example, light from the halo may be guided such that it is directed from the device 100 toward the direction of the mounting base 248 or vehicle itself to create a soft glow around at least a portion of the periphery of the device 100.

The functions and features described herein that relate to the halo may equally apply to light emanating from other areas of the device. Moreover, the functions and features described herein that relate to other light emanating from the device may be applied to the halo.

The mounting base 248 may include engaging features 252 to receive and even secure the front plate 204. These engaging features 252 may engage with at least a portion of the logo/emblem 208 and/or the front plate 204. For instance, the front plate 204 or logo/emblem 208 may include protrusions that engage with at least one receptacle of the mounting base engaging features 252. This engagement may be in the form of at least one interference fit. Alternatively or additionally, the front plate 204 and/or logo/emblem 208 may include a receiving feature (e.g., a receptacle, recess, or equivalent) to engage with at least one of the mounting base engaging features 252. In accordance with embodiments of the present disclosure, the engaging features 252 and/or the interference fits may be configured to allow for the removable attachment of the light directing element 228, the front plate 204 and/or the logo/emblem 208.

In some embodiments, the mounting base 248 may include at least one light directing feature 256. For example, the light may be directed by a reflective or refractive surface, or surfaces, of the mounting base. The light may be directed at least one of toward, through, away from, and behind the logo/emblem 208.

Some embodiments of the present disclosure may include a retaining plate 268. The retaining plate may be configured to connect to the mounting base 248 and affix the illuminated device 100 to a vehicle and/or mount location on a vehicle. The retaining plate 268 may include an opening 272 to allow the one or more electrical leads 244 of the light source 232 to pass through the plate 268. In accordance with embodiments of the present disclosure, the retaining plate of the unit could be incorporated into a vehicle license plate.

Figure 3:
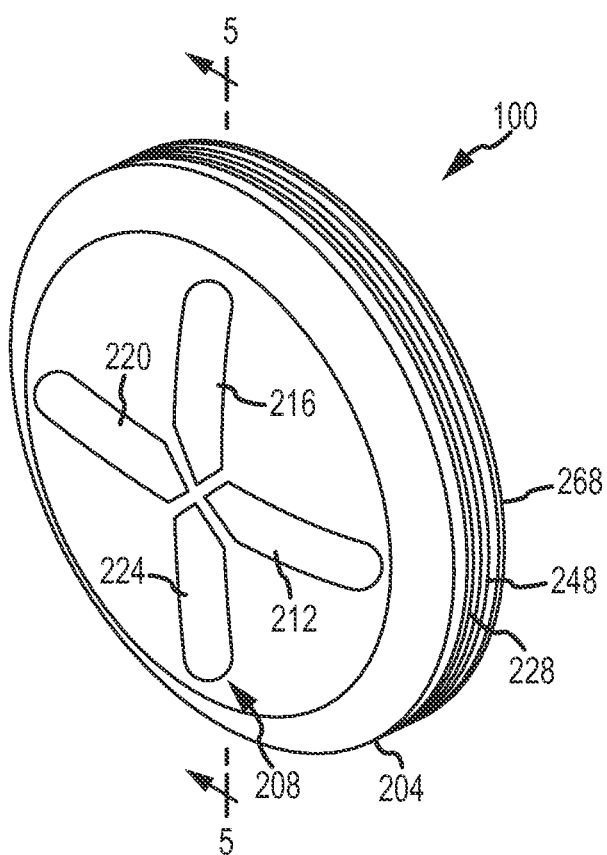
FIG. 3 is a front perspective view of a first embodiment of an illuminated device in accordance with the present disclosure.

Referring to FIG. 3, a front perspective view of a first embodiment of an illuminated device 100 is shown in accordance with the present disclosure. When assembled, the illuminated device 100 may be constructed with minimum height to remain close to the surface of the vehicle. As previously disclosed, the front plate 204 may include a logo/emblem 208. In some embodiments, the logo/emblem 208 may be split into one or more sections 212, 216, 220, 224. These one or more sections 212, 216, 220, 224 may be constructed of a translucent material such that light emanating from a light source 232 (See FIG. 2) may pass through the one or more sections 212, 216, 220, 224. It is an aspect of the present disclosure that the one or more sections 212, 216, 220, 224 may be manufactured in different colors, shapes, and/or translucence.

Figure 4:
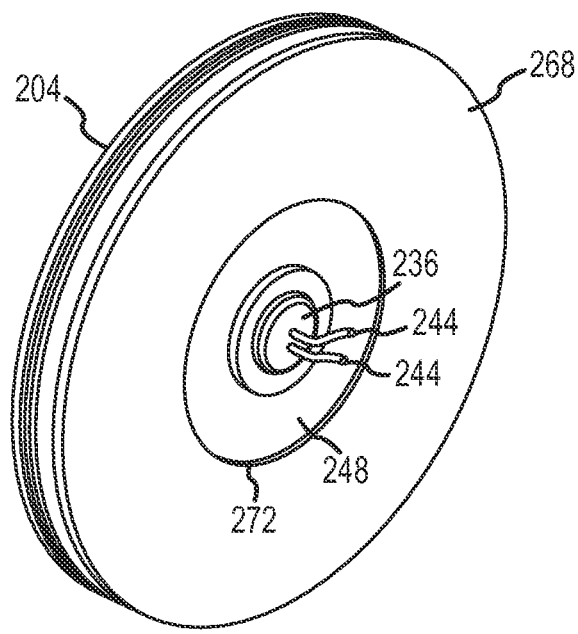
FIG. 4 is a rear perspective view of a first embodiment of an illuminated device in accordance with the present disclosure.

FIG. 4 shows a rear perspective view of a first embodiment of an illuminated device 100 in accordance with the present disclosure. From this view, the one or more electrical leads 244 are shown to pass through the opening 272 in the included retaining plate 268. In some embodiments, the retaining plate 268 may be removably attached to the mounting base 248 via interference fit, mechanical fasteners, or the like. However, it should be noted that the illuminated device 100 may not require a retaining plate 268 to attach to a vehicle or vehicle mount location.

Figure 5:
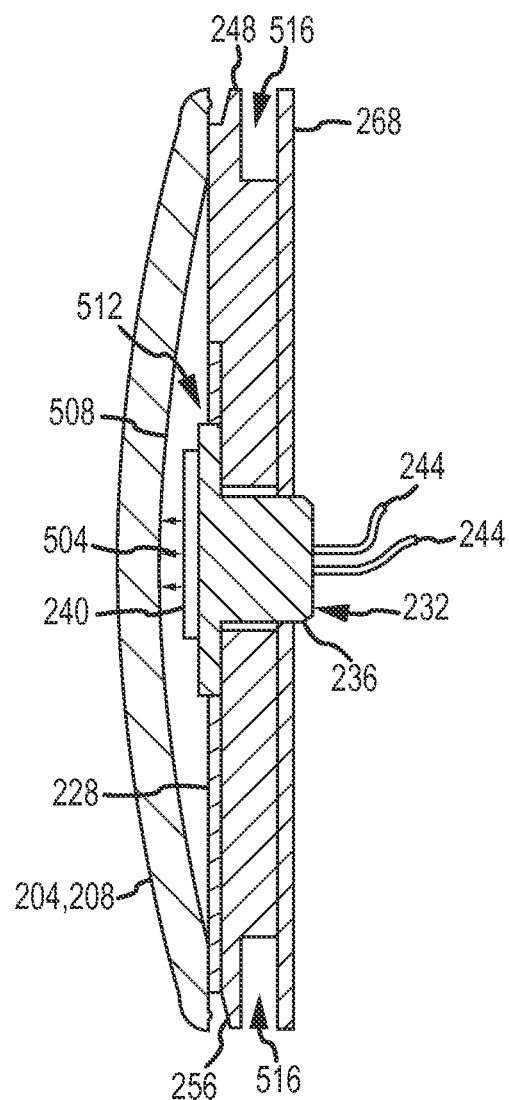
FIG. 5 is a cross-section in elevation of components of an illuminated device in accordance with embodiments of the present disclosure.

FIG. 5 is a cross-section in elevation of components of an illuminated device 100 in accordance with embodiments of the present disclosure. In some embodiments, the one or more lighting elements 240 may be positioned above the mounting base 248. The one or more lighting elements 240 may even be positioned above the one or more light directing elements 228. It is an aspect of the present disclosure that light emanating from the light source 232 may be directed toward the rear surface 508 of the front plate 204 and/or logo/emblem 208. In one embodiment, the rear surface 508 may be constructed from or coated with a reflective material. In this case, the path of light 504 emanating from the light source 232 may be reflected inside an area 512 of the device 100. Light may be directed via the light directing element 228 toward a light directing feature 256 of the mounting base. In other embodiments, the light directing element 228 may direct the light from the light source 232 behind and/or around the front plate 204 and/or logo/emblem 208.

In some embodiments, the illuminated device 100 may include a retaining plate 268 to aid in affixing the illuminated device 100 to a vehicle or vehicle mount area. By utilizing a retaining plate 268 that is capable of being removably attached to a mounting base 248, an attachment area 516 may be created where a portion of the vehicle, or vehicle mount, may be interposed. This attachment area 516 can be configured to cause a portion of a vehicle, or vehicle mount, to be compressed between the retaining plate 268 and mounting base 248 when the retaining plate 268 is affixed to the mounting base 248 (e.g., clamping onto the portion of a vehicle or vehicle mount surface).

Figure 6:
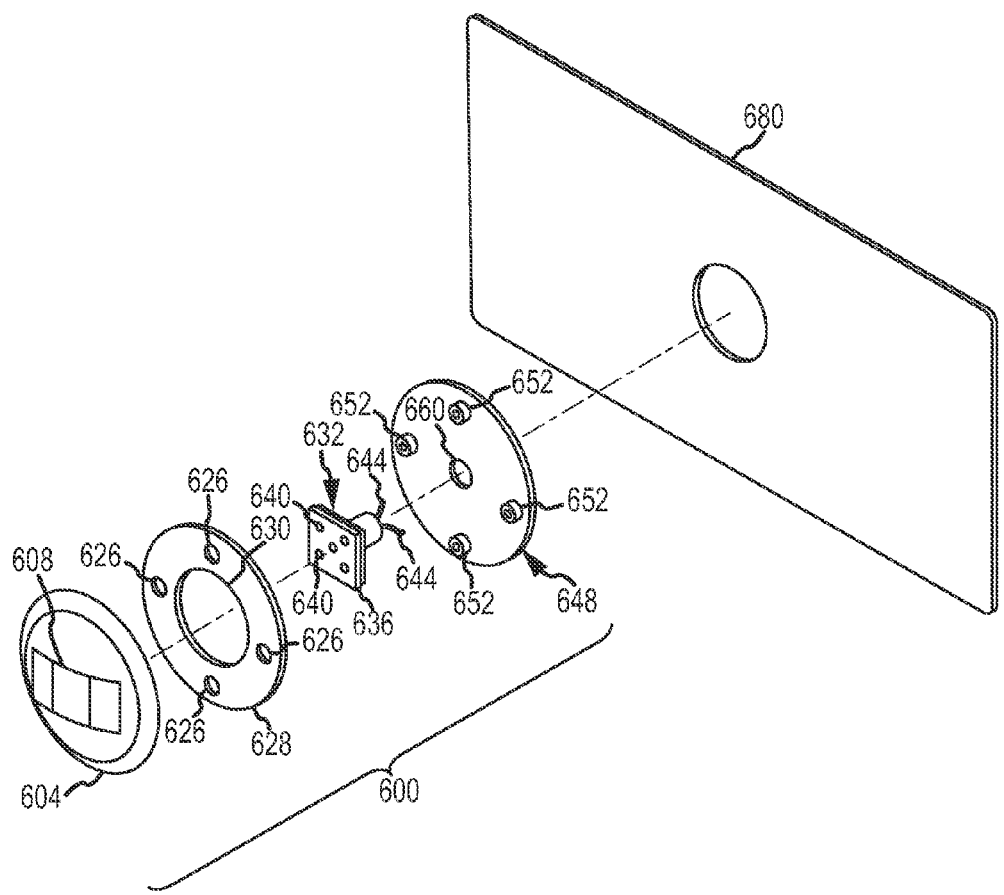
FIG. 6 is an exploded perspective view of components of a second embodiment of an illuminated device in accordance with the present disclosure.

Referring now to FIG. 6, an exploded perspective view of components of a second embodiment of an illuminated device 600 is shown in accordance with the present disclosure. In an embodiment of the present disclosure the device 600 includes a front plate 604 and a custom logo/emblem insert 608 attached to the front plate 604, attached to a mounting base 648, a light source 632 attached in front of the mounting base 648, and one or more light directing elements 628 attached between the front plate 604 and the mounting base 648. In some embodiments, the illuminated device 600 may be removably attached to a vehicle, or vehicle mount, via the use of adhesive, fasteners, interference fits, and the like. Alternatively or additionally, the illuminated device 600 may be permanently attached to a vehicle by similar means. Moreover, in some embodiments, the illuminated device 600 may be similar in construction to the first embodiment of the illuminated device 100 described above. In some embodiments, the illuminated device 600 may attach to a vehicle plate surface 680 that may be attached to a vehicle.

In some embodiments, the one or more light directing elements 628 may include location features 626, 630. The location features 626, 630 may orient the light directing element 628 in a specific position. This orientation may be especially important where the light directing element includes multiple sections, facets, or colors. These location features 626 may interface with, or interconnect to, receiving features on the mounting base 648, the front plate 604, or both.

The mounting base 648 may further include a plurality of engaging features 652. These engaging features 652 may be configured to receive and/or locate the front plate 604. It is an aspect of the present disclosure that one or more of the engaging features 652 may be used to accept a fastening means for attachment to a vehicle. For instance, it is anticipated that the one or more engaging features 652 may be tapped to receive a screw or other type of threaded fastener. Alternatively, the engaging feature 652 may include a hole that is appropriately sized to accommodate a self-tapping fastener. In addition, it is anticipated that the engaging feature 652 may include a sized receptacle capable of receiving a complementary sized plug to join the illuminated device 600 to a vehicle.

Figure 7:
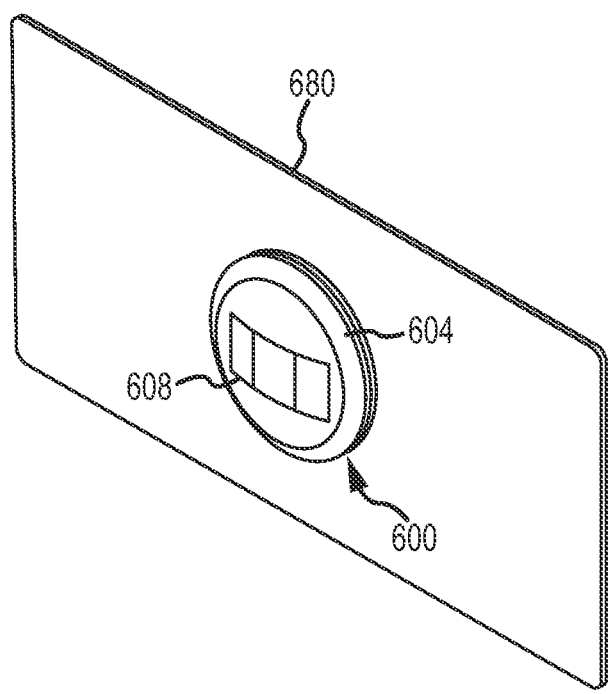
FIG. 7 is a front perspective view of a second embodiment of an illuminated device in accordance with the present disclosure.

FIG. 7 shows a front perspective view of a second embodiment of an illuminated device 600 in accordance with the present disclosure. In some embodiments, the illuminated device 600 may be located on or adjacent to a vehicle plate surface 680 attached to a vehicle. It is an aspect of the present disclosure that the illuminated device 600 may be attached to the vehicle plate surface 680, or other plate on a vehicle where the fastening means that attach the illuminated device 600 may be hidden when assembled. In other words, the illuminated device 600 may be attached to a plate before the plate is attached to the vehicle. Therefore, removing the illuminated device 600 from the vehicle may require removal of the plate from the vehicle before the illuminated device can be removed. At least one benefit of this feature is an added level of security from casual theft.

Figure 8:
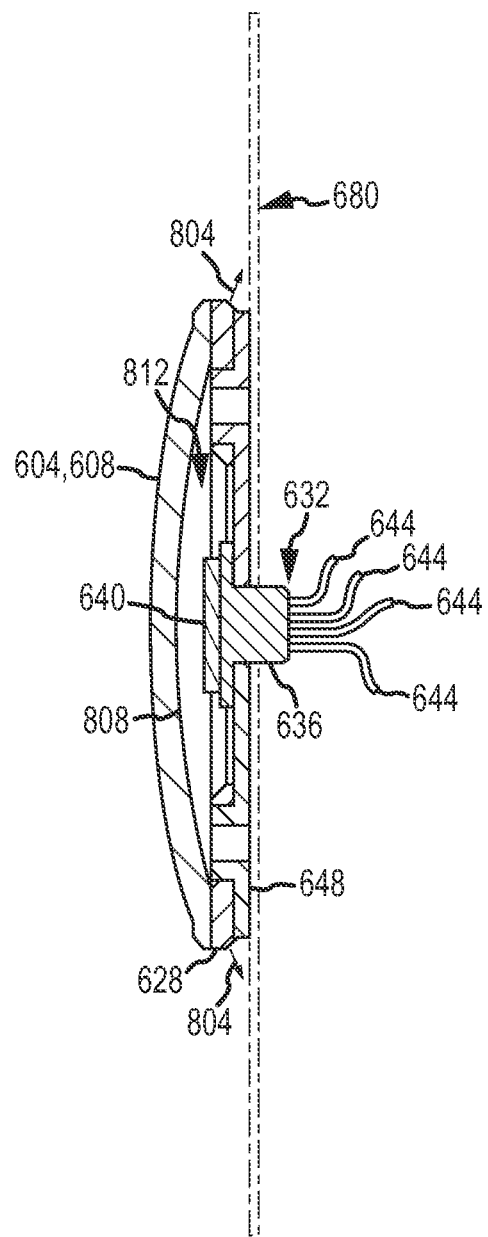
FIG. 8 is a cross-section in elevation of components of a second embodiment of an illuminated device in accordance with the present disclosure.

Referring to FIG. 8 a cross-section in elevation of components of a second embodiment of an illuminated device is shown in accordance with the present disclosure. In some embodiments, the front plate 604 and/or logo/emblem 608 directly contacts the at least one light directing elements 628 when assembled. It is an aspect of the present disclosure that the light source 632 may direct light in a light path 804 away from and/or behind the logo/emblem 608. In some embodiments, the light directed behind the logo/emblem 608 in a light path 804 may cause the logo/emblem 608 to appear as if it is floating above a vehicle plate or surface 680. In accordance with the present disclosure, the light may be directed around at least a portion of the periphery of a logo/emblem 608. Directing light around a substantial portion of the logo/emblem 608 periphery may cause a halo effect of illumination as previously disclosed.

Figure 9:
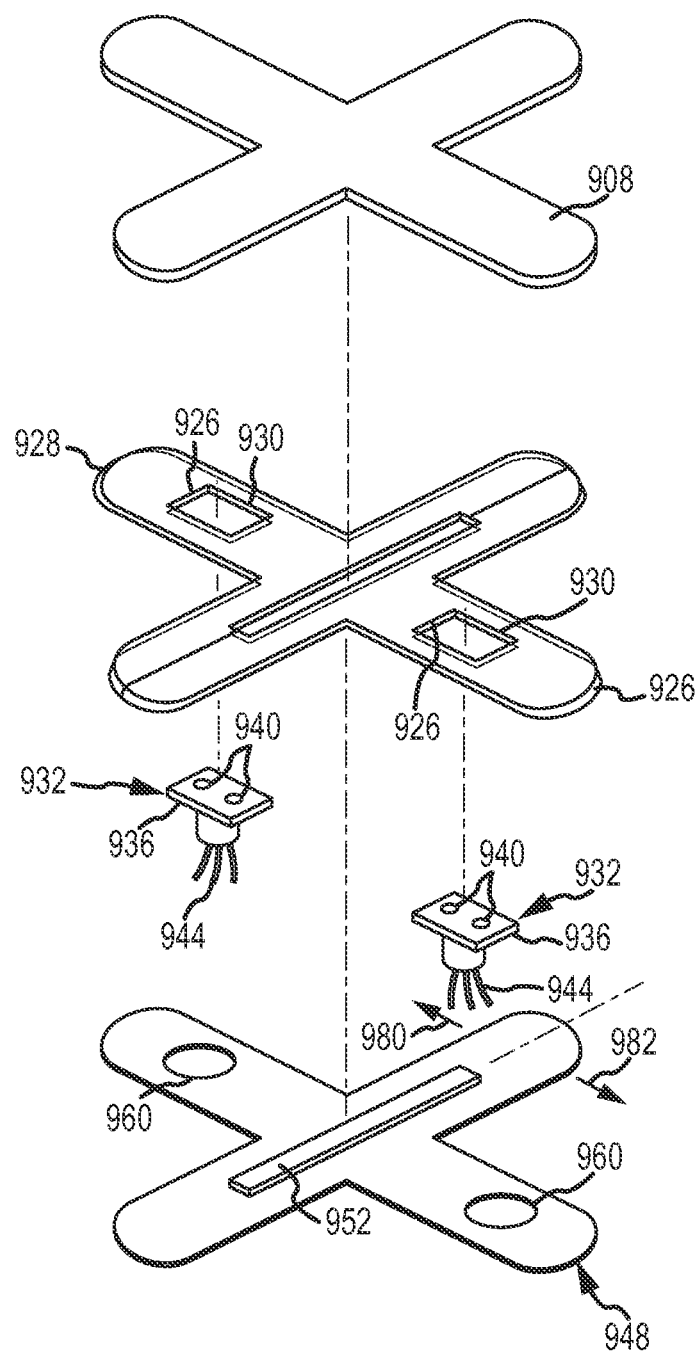
FIG. 9 is an exploded perspective view of components of a third embodiment of an illuminated device in accordance with the present disclosure.

FIG. 9 is an exploded perspective view of components of a third embodiment of an illuminated device 900 in accordance with the present disclosure. The illuminated device 900 may include a logo/emblem 908, at least one light directing element 928 in direct contact with the rear side of the logo/emblem 908, a mounting base 948, and two or more light sources 932 attached between the mounting base 948 and the logo/emblem 908.

The logo/emblem 908 may be opaque, translucent, and/or combinations thereof. Although shown separated into a left portion 980 and a right portion 982 by a divider 952, the light sources 932 may be operated independently of each other and/or together. Furthermore, although the device is shown once horizontally split, the device may be split vertically, radially, or in any geometric shape and in any number of splits that the logo/emblem 908 and light sources 932 can accommodate.

As previously disclosed, the light sources 932 may be activated according to specific vehicle functions. For instance, in a situation where a vehicle is indicating, or activating a turn signal to turn left, the light source 932 on the left portion 980 of the illuminated device 900 may be activated to display in intermittent flashing signal from the left portion 980 of the device 900. Further, this turn signal may be configured to display an indication color (e.g., amber, orange, red, etc.). Additionally or alternatively, when vehicle brakes are applied, the light sources 932 on the left portion 980 and the right portion 982 of the device 900 may be activated together to display that the vehicle is braking. As can be appreciated, the light sources 932 once activated may be configured to display a color associated with vehicle braking (e.g., red, orange, crimson, etc.).

In some embodiments, the one or more light directing elements 928 may include facets or other angled surfaces 926 to direct light toward a viewer from any side of a logo/emblem 908. This direction of light may be achieved either directly and/or incidentally. For instance, light directed via the prismatic properties of a light directing element 928 to the eye of a viewer is considered a direct light path. On the other hand, light directed from a light directing element to an area behind a logo (as shown by light path 804 in FIG. 8) is considered to be an incidental light path. In any event, the properties of a light source 932 may be detected by a viewer whether the light is directed incidentally or directly.

In one embodiment, the logo/emblem 908 may be opaque and the light emitted from the one or more light sources 932 may be directed from each side to an area behind the logo/emblem 908. The light directed to a surface behind the logo/emblem 908 may create a halo effect of the logo/emblem 908. It is one aspect of the halo lighting to cause the logo/emblem to appear as if it is floating above the surface from which the light is reflecting. Moreover, the surface behind the logo/emblem 908 may reflect the color that the one or more light source 932 is emitting at any given time.

Figure 10:
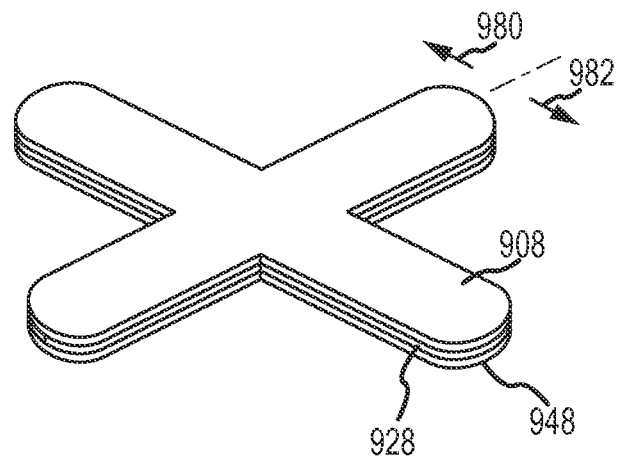
FIG. 10 is a front perspective view of a third embodiment of an illuminated device in accordance with the present disclosure.

FIG. 10 is a front perspective view of a third embodiment of an illuminated device in accordance with the present disclosure. It is an aspect of the present disclosure that the logo/emblem 908 is in direct contact with the one or more light directing elements 928. This direct contact between the logo/emblem 908 and the light directing elements 928 eliminates gaps between the two components and offers the added benefit of increased weather resistance.

Figure 11:
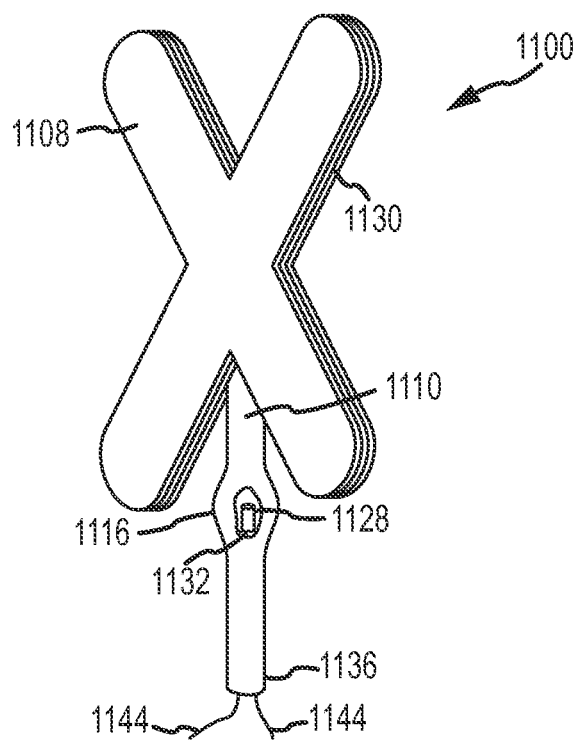
FIG. 11 is a front perspective view of a fourth embodiment of an illuminated device in accordance with the present disclosure.

Referring now to FIG. 11 a front perspective view of a fourth embodiment of an illuminated device 1100 is shown in accordance with the present disclosure. The illuminated device 1100 includes a logo/emblem 1108 affixed to a support 1112, which in turn is attached to a shroud 1116 and base 1136. A light source 1132 may be located inside the shroud 1116 and is configured to be optically coupled with the logo/emblem 1108. The optical coupling may be achieved via at least one fiber optic 1128 that runs from the light source 1132 to the logo/emblem 1108. The logo/emblem 1108 may include one or more translucent portions 1130 that may be configured to direct light, received from the fiber optic 1128, around the periphery of the logo/emblem 1108. In some embodiments, the illuminated device 1100 may be used as a hood ornament for a vehicle. In one embodiment, the support 1112 may itself be the fiber optic 1128

It is an aspect of the present disclosure to encapsulate the light source 1132 inside the shroud 1116, which is located adjacent to the logo/emblem 1108. Encapsulating the light source 1132, among other things, offers protection from weather and exposure. The light source 1132 may be conductively connected to a power source via electrical leads 1144 that pass through the base 1136 of the illuminated device 1100. The logo/emblem 1108 may have a front and a rear surface. The front surface may face the forward travel direction of the vehicle. In some embodiments, the rear surface may face a vehicle operator. While it is an aspect of the present disclosure that the front surface may be configured to illuminate, the rear surface of the logo/emblem 1108 may be prevented from illuminating during operation (e.g., to prevent operator distraction, obstruction, etc.).

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. Further, the disclosure(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. An illuminated device configured for attachment to a vehicle, comprising:
   a base structure including a front portion, a back portion, an attachment mechanism, and a light source retaining mechanism;
   a light source having at least one light emitting surface, wherein the at least one light emitting surface is arranged in front of the front portion of the base structure and the light source is engaged with the light source retaining mechanism, and wherein the at least one light emitting surface of the light source faces away from the front portion of the base structure;
   at least one light directing element arranged in front of the front portion of the base structure, wherein the at least one light directing element is arranged adjacent to the at least one light source, wherein the at least one light emitting surface of the light source is disposed in front of the at least one light directing element, and wherein the at least one light directing element is at least partially translucent; and
   an emblem element having a front surface and a rear surface, wherein at least a portion of the emblem is arranged in front of the light directing element and the at least one light emitting surface of the light source, such that the at least one light emitting surface of the light source emits light directly onto the rear surface of the emblem, and wherein the emblem element is configured to engage the base structure.

2. The illuminated device of claim 1, wherein the light source comprises one or more light emitting diodes ("LEDs"), the one or more LEDs affixed to a board, wherein the board includes electrically conductive traces configured to connect a power source to the one or more LEDs.

3. The illuminated device of claim 2, wherein the one or more LEDs are configured to produce two or more colors.

4. The illuminated device of claim 1, wherein an area of the emblem rear surface is at least partially reflective and the emblem front surface is at least partially opaque.

5. The illuminated device of claim 1, wherein the emblem element includes at least one interior section that is at least one of translucent and transparent.

6. The illuminated device of claim 5, wherein the light source is configured to direct light through at least a portion of the at least one interior section.

7. The illuminated device of claim 1, wherein the emblem element further comprises:
   a receptacle portion configured to be at least one of translucent and transparent;
   a removable insert arranged within or adjacent to the receptacle portion, wherein the removable insert is configured to display a custom symbol; and
   a retaining feature configured to selectively retain the removable insert adjacent to the receptacle portion.

8. The illuminated device of claim 1, wherein the back portion of the base structure is configured to engage a retaining plate and the illuminated device further comprises the retaining plate.

9. The illuminated device of claim 1, wherein the at least one light directing element further comprises;
   a front face;
   a rear face;
   at least one interior surface joining the front face and the rear face; and
   at least one exterior surface joining the front face and the rear face.

10. The illuminated device of claim 9, wherein the at least one interior surface and the at least one exterior surface are angled to direct light behind the emblem element.

11. The illuminated device of claim 9, wherein one or more of the at least one interior surface and the at least one exterior surface comprises a plurality of surfaces.

12. An illuminated device system, comprising:
   an illuminated device, comprising:
      a base structure including a front portion, a back portion, an attachment mechanism, and a light source retaining mechanism;
      a light source having at least one emitting surface, wherein the at least one light emitting surface is arranged in front of the front portion of the base structure and the light source is engaged with light source retaining mechanism, and wherein the at least one light emitting surface of the light source faces away from the front of the base structure;
      at least one light directing element arranged in front of the front portion of the base structure, wherein the at least one light directing element is arranged adjacent to the at least one light source, wherein the at least one light emitting surface of the light source is disposed in front of the at least one light directing element, and wherein the at least one light directing element is at least partially translucent; and
      an emblem element having a front surface and a rear surface ,wherein at least a portion of the emblem is arranged in front of the light directing element and the at least one light emitting surface of the light source, such that the at least one light emitting surface of the light source emits light directly onto the rear surface of the emblem element, and wherein the emblem element is configured to engage the base structure;
   a switching circuitry; and
   a power source.

13. The system of claim 12, wherein the switching circuitry is electrically connected between the power source and the illuminated device.

14. The system of claim 13, wherein the power source is a vehicle power source.

15. The system of claim 13, wherein the power source receives power from solar elements connected to the power source.

16. The system of claim 13, wherein the switching circuitry includes a controller, and wherein the controller is configured to receive at least one signal from a vehicle and control a color of light produced by the light source based in part on the at least one signal received.

17. The system of claim 16, wherein the switching circuitry is configured to control the state of light produced by the light source based in part on the at least one signal received, wherein the state of light includes at least one of intensity, brightness, and illumination time.

18. The system of claim 16, wherein the at least one signal received by the controller is associated with one or more of vehicle functions such as braking, reversing, indicating, high beam head lights, low beam headlights, daytime running lights, and hazard lights.

19. An illuminated device configured for attachment to a vehicle, comprising:
- an emblem element having an emblem area configured to completely encompass a logo of the vehicle, wherein the emblem element includes a front surface and a rear surface, and wherein the emblem element further comprises:
  - at least one light directing element disposed between the front and rear surfaces of the emblem element and inside the emblem area, wherein the at least one light directing element is at least one of translucent and transparent;
- a base support having a first end and a second end, wherein the base support includes a hollow section between the first end and the second end, and wherein the first end of the base support is attached to the emblem element;
- a light source disposed within the hollow section of the base support, wherein the light source is disposed outside of the emblem area of the emblem element; and
- a light coupling element, wherein the light coupling element is configured to optically couple light provided by the light source from outside the emblem area to the at least one light directing element of the emblem element inside the emblem area.

20. The illuminated device of claim 19, where the second end of the base support is configured to attach to the vehicle, and
wherein the at least one light directing element is configured to direct light received from the light source to at least one portion of the emblem element.

* * * * *